(12) United States Patent
Brill et al.

(10) Patent No.: US 11,235,700 B2
(45) Date of Patent: Feb. 1, 2022

(54) ILLUMINATION DEVICE, IN PARTICULAR FOR A MOTOR VEHICLE

(71) Applicant: Bayerische Motoren Werke Aktiengesellschaft, Munich (DE)

(72) Inventors: Florian Brill, Jena (DE); Dominik Drozdzyk, Wroclaw (PL); Tina Gehb, Unterhaching (DE); Burkhard Lewerich, Munich (DE); Martin Mueller, Jena (DE); Alf Riedel, Jena (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 468 days.

(21) Appl. No.: 16/406,519

(22) Filed: May 8, 2019

(65) Prior Publication Data

US 2019/0263318 A1 Aug. 29, 2019

Related U.S. Application Data

(63) Continuation of application No. PCT/EP2017/076525, filed on Oct. 18, 2017.

(30) Foreign Application Priority Data

Nov. 9, 2016 (DE) ...................... 10 2016 221 918.9

(51) Int. Cl.
*B60Q 1/32* (2006.01)
*B60Q 1/26* (2006.01)
(Continued)

(52) U.S. Cl.
CPC .......... *B60Q 1/323* (2013.01); *B60Q 1/2696* (2013.01); *F21S 41/141* (2018.01); *F21S 41/143* (2018.01);
(Continued)

(58) Field of Classification Search
CPC ........ F21S 41/265; F21S 41/43; F21S 41/151; F21S 41/153; F21S 41/275; B60Q 1/323; B60Q 1/24; B60Q 2400/40
See application file for complete search history.

(56) References Cited

U.S. PATENT DOCUMENTS

| 2007/0053195 A1* | 3/2007 | Alberti | ................. B60Q 1/2665 362/494 |
| 2008/0192342 A1 | 8/2008 | Wood | |

(Continued)

FOREIGN PATENT DOCUMENTS

| DE | 10 2007 029 204 A1 | 1/2009 |
| DE | 10 2009 024 894 A1 | 12/2010 |

(Continued)

OTHER PUBLICATIONS

PCT/EP2017/076525, International Search Report dated Jan. 25, 2018 (Three (3) pages).
German Search Report issued in German counterpart application No. 10 2016 221 918.9 dated Jul. 5, 2017, with Statement of Relevancy (Eight (8) pages).

*Primary Examiner* — William J Carter
(74) *Attorney, Agent, or Firm* — Crowell & Moring LLP

(57) ABSTRACT

An illumination device for a motor vehicle includes a multi-aperture projection display having a lighting means for illuminating a plurality of image segments and an array of projection lenses, where each projection lens is assigned an image segment, from the plurality of image segments, that is projected into a projection plane by way of a corresponding one of the projection lens, such that a light distribution is produced from all of the projected image segments in the projection plane. The array of projection lenses comprises a plurality of subarrays, where a respective subarray contains the same projection lenses and the projection lenses of different subarrays differ from one another such that each subarray generates a surface area in the light (Continued)

distribution and a size and/or a position of the generated surface areas varies between the plurality of subarrays.

14 Claims, 7 Drawing Sheets

(51) Int. Cl.
| | |
|---|---|
| *F21S 41/265* | (2018.01) |
| *F21S 41/141* | (2018.01) |
| *F21S 41/43* | (2018.01) |
| *F21S 43/20* | (2018.01) |
| *F21S 41/143* | (2018.01) |

(52) U.S. Cl.
CPC ............ *F21S 41/265* (2018.01); *F21S 41/43* (2018.01); *F21S 43/26* (2018.01)

(56) References Cited

U.S. PATENT DOCUMENTS

| | | | |
|---|---|---|---|
| 2014/0320823 A1* | 10/2014 | Ammar | B60Q 1/32 353/13 |
| 2015/0138794 A1* | 5/2015 | Salter | B60Q 1/24 362/510 |
| 2015/0252975 A1 | 9/2015 | Nakada | |
| 2016/0018081 A1 | 1/2016 | Kadoriku et al. | |

FOREIGN PATENT DOCUMENTS

| | | |
|---|---|---|
| DE | 10 2011 076 083 A1 | 11/2012 |
| DE | 10 2013 211 877 A1 | 1/2015 |
| EP | 2 674 328 A2 | 12/2013 |
| WO | WO 2012/156280 A1 | 11/2012 |
| WO | WO 2014/164792 A1 | 10/2014 |
| WO | WO 2015/058227 A1 | 4/2015 |

* cited by examiner

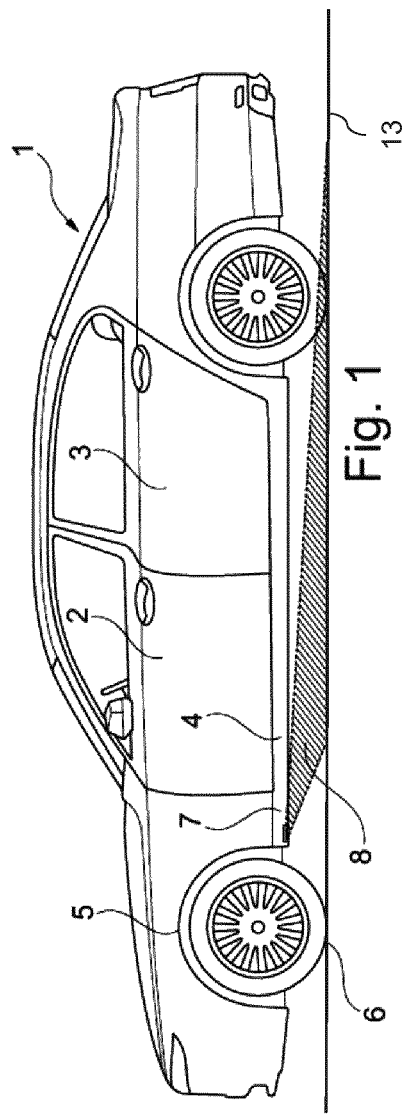
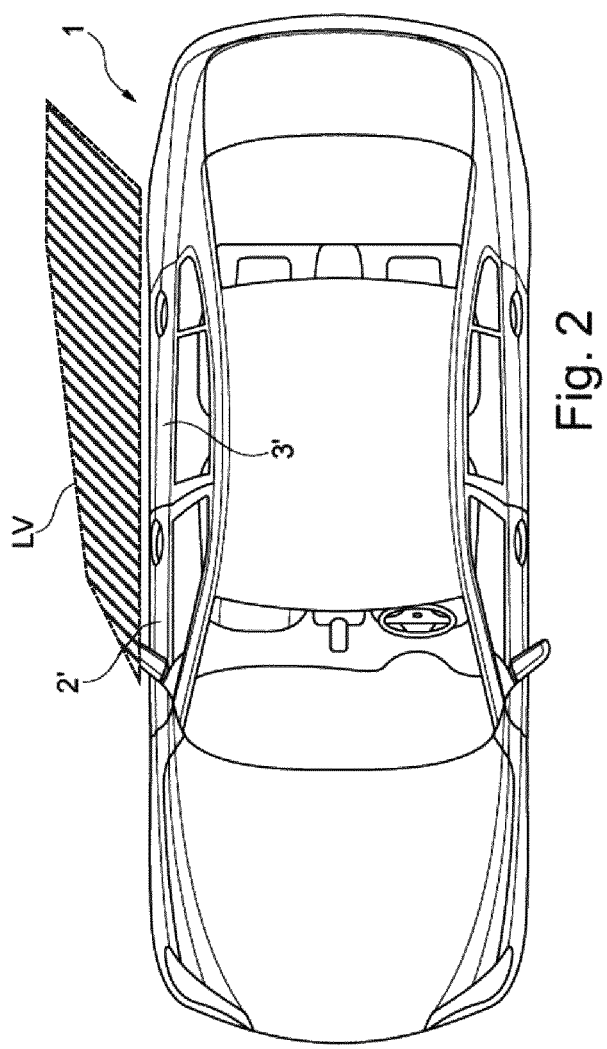

ILLUMINATION DEVICE, IN PARTICULAR FOR A MOTOR VEHICLE

CROSS REFERENCE TO RELATED APPLICATIONS

This application is a continuation of PCT International Application No. PCT/EP2017/076525, filed Oct. 18, 2017, which claims priority under 35 U.S.C. § 119 from German Patent Application No. 10 2016 221 918.9, filed Nov. 9, 2016, the entire disclosures of which are herein expressly incorporated by reference.

BACKGROUND AND SUMMARY OF THE INVENTION

The prior art discloses multi-aperture projection displays that image segments into a projection plane using a multiplicity of optical channels comprising corresponding projection lenses. Such a projection display is described for example in document DE 10 2009 024 894 A1.

The abovementioned projection displays are used for example as an ambient illumination apparatus in a motor vehicle. Document DE 10 2013 211 877 A1 discloses a multi-aperture projection display that is installed in the door sill of a motor vehicle and generates a light distribution on the ground at the side next to the motor vehicle in the manner of a light carpet.

In conventional multi-aperture projection displays, the same projection lens is used in each optical channel, wherein each projection lens produces the same individual image in the projection plane. The individual images each cover the entire light distribution in the projection plane, such that the light distribution is a superimposition of the individual images. This has the disadvantage that, if the projection plane is inclined with respect to the projection lenses, constant brightness of the light distribution is not guaranteed as the brightness of the light distribution decreases by approximately the power of three in relation to the distance of the surface areas of the projection plane from the projection display.

In order to guarantee a uniform brightness distribution for oblique projection planes, particular regions in the individual image segments of a multi-aperture display may be shaded in order thereby to reduce the brightness of regions lying closer to the projection display in the projected light distribution. However, this leads to a loss of light and thus to poor efficiency of the projection display.

An object of the invention is therefore to provide an illumination device having a multi-aperture projection display that easily and efficiently makes it possible to project light in the projection plane with a predefined brightness distribution.

The illumination device according to the invention, which is preferably intended for a motor vehicle, comprises a multi-aperture projection display having a lighting means for illuminating a multiplicity of image segments and an array of projection lenses, wherein each projection lens is assigned an image segment that is projected into a projection plane by way of the associated projection lens, as a result of which a light distribution is produced from all of the projected image segments in the projection plane. In one preferred variant, the lighting means comprises one or more LEDs, such as for example RGB-LEDs, and/or laser diodes. The projection lenses are preferably microlenses that have a maximum extent of 2000 μm or less in plan view. Depending on the refinement, the number of the projection lenses may vary. The array preferably comprises between 100 and 400 projection lenses. All of the projection lenses preferably lie in a common plane. The image segments illuminated by the lighting means may be produced for example by a chrome mask or an imager, such as for example an LED display.

The illumination device according to the invention is distinguished in that the array of projection lenses comprises a plurality of subarrays, wherein a respective subarray contains the same projection lenses and the projection lenses of different subarrays differ from one another such that each subarray generates a surface area in the light distribution and the size and/or the position of the generated surface areas varies between the subarrays. Depending on the refinement, the surface areas of the subarrays may overlap with one another or be separate from one another. By using different projection lenses, a situation is easily able to be achieved whereby surface areas in the projected light distribution are illuminated with a varying intensity without light losses occurring.

In one particularly preferred embodiment, the subarrays comprise a first subarray whose generated surface area corresponds to the overall area of the light distribution in the projection plane, and a second subarray whose generated surface area is a subarea of the light distribution in the projection plane. As a result of this, a particular subarea of the light distribution is able to be illuminated more intensely in a dedicated manner. In another embodiment, only a subarea of the light distribution is also generated by the first subarray, wherein this subarea possibly overlaps with the subarea that the second subarray generates.

In one particularly preferred embodiment of the illumination device according to the invention, all of the projection lenses of the array are based on a predetermined lens type with a prescribed shape and size, wherein the projection lenses of one or more of the subarrays each constitute a subregion of the predetermined lens type in the plan view thereof. As a result of this, the generation of a sharp light distribution in the projection plane is achieved in a simple manner. Furthermore, one of the subarrays is preferably configured such that the projection lenses of this subarray each correspond to the predetermined lens type. In one particularly preferred variant, this subarray is the above-described first subarray whose generated surface area corresponds to the overall area of the light distribution in the projection plane.

In another preferred refinement, the abovementioned subregion of the predetermined lens type is a region that is delineated by the area of the predetermined lens type in the plan view thereof by way of one or more lines. Depending on the embodiment, the lines may each be at least sectionally straight and/or at least sectionally curved. In the event that the predetermined lens type has a circular edge in plan view, the lines may constitute for example chords of the circle.

In another variant of the illumination device according to the invention, the image segments each contain an object structure that is projected into the projection plane by the associated projection lens. The object structure may be formed for example by a chrome mask. The object structures of the image segments that are projected by the projection lenses of the same subarray are configured such that these object structures produce the same individual image in the corresponding surface area in the projection plane.

In one particularly preferred variant of the above-described embodiment, a respective object structure of the above-described second subarray constitutes a section of a respective object structure of the above-described first subarray, such that, in the region of overlap of the generated surface areas of the first and second subarrays, the images of the two subarrays correspond to one another. This thereby ensures that the individual images of the first and second subarrays are superimposed congruently.

Depending on the refinement, the illumination device according to the invention may take on various functions in a motor vehicle. For example, the illumination device may be integrated in a headlight or in a light of the motor vehicle. In one particularly preferred variant, however, the illumination device is an ambient illumination apparatus for producing a light distribution on the ground in the surroundings of the motor vehicle. In this context, the ground constitutes the projection plane for the multi-aperture projection display.

In one preferred variant in which the illumination device is an ambient illumination apparatus, the projection lenses of the subarrays are configured such that, in an oblique installation position of the ambient illumination apparatus in the motor vehicle, the light intensity of the light radiation of the multi-aperture projection display in a first angular range, which falls on a region of the ground at a greater distance from the multi-aperture projection display than a second angular range, is higher than the light intensity of the light radiation of the multi-aperture projection display in the second angular range. The oblique installation position is distinguished in that the ground is inclined with respect to the plane in which the projection lenses are arranged, that is to say the ground does not run perpendicular and does not run parallel to this plane. With this variant of the invention, it is possible to counteract a reduction in the brightness of the light distribution on the oblique projection surface of the ground.

In addition to the above-described illumination device, the invention furthermore relates to a motor vehicle that comprises one or more of the illumination devices according to the invention or preferred variants of these illumination devices.

Exemplary embodiments of the invention are described in detail below with reference to the appended figures.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a side view of a motor vehicle having an ambient illumination apparatus according to the invention.

FIG. 2 shows a plan view of the motor vehicle from FIG. 1.

Figure 3:
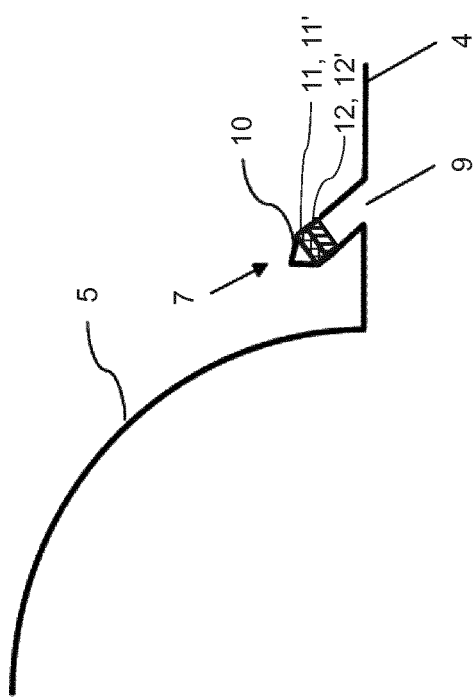
FIG. 3 shows a schematic detailed view of the ambient illumination apparatus shown in FIG. 1.

One embodiment of an illumination device according to the invention is explained below with reference to an ambient illumination apparatus in a motor vehicle. The ambient illumination apparatus is integrated in the door sill of the motor vehicle and intended to laterally illuminate the region next to the passenger doors of the motor vehicle.

DETAILED DESCRIPTION OF THE DRAWINGS

FIG. 1 shows a side view of the motor vehicle in the form of the automobile 1, which is standing on the ground 13. On the left-hand side that is illustrated, the automobile comprises a driver door 2 and a rear door 3. In the same way, a front passenger door 2' and a rear door 3' situated behind it are provided on the opposite side of the vehicle (FIG. 2). In the embodiment of FIG. 1, an ambient illumination apparatus in the form of a multi-aperture projection display 7 is provided in the door sill 4 underneath the doors 2 and 3. This illumination apparatus is situated at the front end of the door sill 4 in the region of the wheel case 5 that surrounds the wheel 6. The multi-aperture projection display comprises an array of projection lenses 12, 12' in the form of microlenses, as is visible in particular in FIGS. 4 and 5. A predetermined light distribution is projected onto the ground 13 next to the doors 2 and 3 of the motor vehicle using the multi-aperture projection display.

It is known from DE 10 2013 211 877 A1 to use a multi-aperture projection display as ambient illumination apparatus, the projection lenses of which multi-aperture projection display all have the same size. In particular, in this case, the multi-aperture projection display that is described in document DE 10 2009 024 894 A1 is used. In this display, the individual projection lenses produce the same individual image, wherein the projected overall image consists of the superimposition of these individual images. In contrast thereto, in the ambient illumination apparatus described here, a multi-aperture projection display is used that has different projection lenses so as thereby to compensate for differences in brightness in the projected light distribution, as is explained in even more detail below.

In FIG. 1, the direction of propagation of the light of the multi-aperture projection display 7 cast onto the ground 13 is referenced using reference sign 8. By way of this light, the light distribution LV is projected on the ground next to the vehicle 1, this being visible from the plan view of FIG. 2. This light distribution produces the effect of a light carpet. It should be borne in mind here that the light distribution, unlike in FIG. 1, is depicted on the right next to the vehicle 1 adjacent to the doors 2' and 3'. This is possible because multi-aperture projection displays 7 are installed symmetrically on the right-hand side and left-hand side in the motor vehicle. In other words, correspondingly mirrored light distributions are produced on both the left-hand side and the right-hand side of the vehicle adjacent to the entrance doors. For the sake of clarity, only the light distribution adjacent to the doors 2' and 3' is depicted in FIG. 2.

In the exemplary embodiment of FIG. 2, the light distribution LV constitutes a pattern of parallel strips that run obliquely to the longitudinal axis of the vehicle. The strips are illustrated in dark and represent bright beams on the ground next to the vehicle in the actual light distribution. As is clear from FIG. 2, the light distribution propagates from the front door 2' to the region behind the door 3'. As the light of the multi-aperture projection display 7 falls obliquely on the ground 13 next to the motor vehicle 1, in the case of using the abovementioned conventional multi-aperture projection display with identical projection lenses, the problem exists that the brightness of the light pattern LV decreases with increasing distance from the multi-aperture projection display. This is down to the fact that all of the identically constructed projection lenses emit in the same angular range. In contrast thereto, the multi-aperture projection display 7 described here contains projection lenses of different kinds that emit in different angular ranges, such that it is possible to achieve a uniform brightness of the light distribution with increasing distance from the multi-aperture projection display, as is explained in even more detail below.

FIG. 3 shows a sectional detailed view of the multi-aperture projection display from FIG. 1. The display 7, which is integrated adjacent to the wheel case 5 in the door sill 4, comprises a lighting means 10, indicated schematically, which comprises an LED as light source and collimation optics so as thereby to generate substantially parallel light. This light falls on a plurality of image segments or slides 11, 11', which are indicated only schematically in FIG. 3. The slides contain corresponding object structures for producing the strip-shaped light distribution LV. Situated in front of the slides 11, 11' is an array of projection lenses 12, 12', which is likewise depicted only schematically in FIG. 3. Each slide is in this case assigned a projection lens that projects the object structure of the slide onto the ground 13 next to the motor vehicle 1, such that the light distribution LV is produced by the projected images of all of the projection lenses. The multi-aperture projection display 7 is arranged in a light well 9 that runs obliquely rearward, such that it is ensured that the lighting means is not able to be viewed directly, thus taking into account legal requirements.

Figure 4:
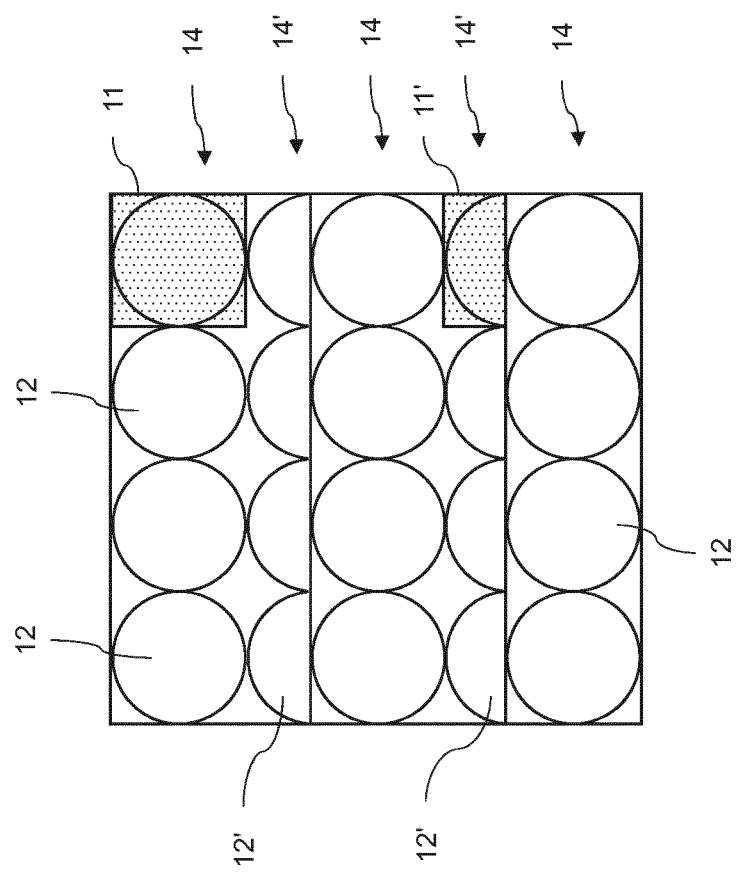

FIG. 4 shows a schematic plan view of a variant of an array of projection lenses, which array is able to be used in the multi-aperture projection display 7 from FIG. 3. The array comprises both round projection lenses 12 and semicircular projection lenses 12'. For the sake of clarity, only some of the projection lenses are provided with the reference signs 12 or 12'. The projection lenses 12 form a first subarray 14 that is formed by the first, third and fifth rows of the illustrated array. By contrast, the second row and the fourth row of the array form a second subarray 14' with the semicircular projection lenses 12'. All of the projection lenses 12 of the first subarray 14 are identical in structure. In the same way, all of the projection lenses 12' of the second subarray are also identical in structure. Situated behind each of the projection lenses 12, 12' is a slide, a single slide 11 for a projection lens 12 and a single slide 11' for a projection lens 12' being indicated by dotted rectangles by way of example. The semicircular projection lenses 12' correspond exactly in terms of structure to the upper half of a projection lens 12. Consequently, all of the projection lenses 12 and 12' have the same focal length. In the same way as for the projection display disclosed in the abovementioned document DE 10 2009 024 894 A1, the distance between the projection lenses and the associated slides corresponds to the focal length of the projection lenses. Furthermore, the field lenses disclosed in the above document may also possibly be arranged in front of the corresponding slides.

All of the slides 11 belonging to the projection lenses 12 contain the same object structure, which is configured such that the strip-shaped light distribution LV is produced on the ground 13 next to the motor vehicle doors. The projection lenses 12 in this case each produce an individual image that corresponds to the size of the overall light distribution LV. A superimposition of the same individual images is thus achieved by the projection lenses 12. As already described above, the brightness of the light distribution decreases with increasing distance from the projection display in the case of the sole use of projection lenses 12 on account of the oblique alignment of the projection display with respect to the ground. To counteract this decrease, the projection lenses 12' exclusively project light into a region of the light distribution LV that is remote from the projection display. The respective object structures of the slides 11' in this case constitute the upper half of the corresponding object structures in the slides 11, such that there is overlapping of the images from both types of projection lens 12 and 12'.

Figure 5:
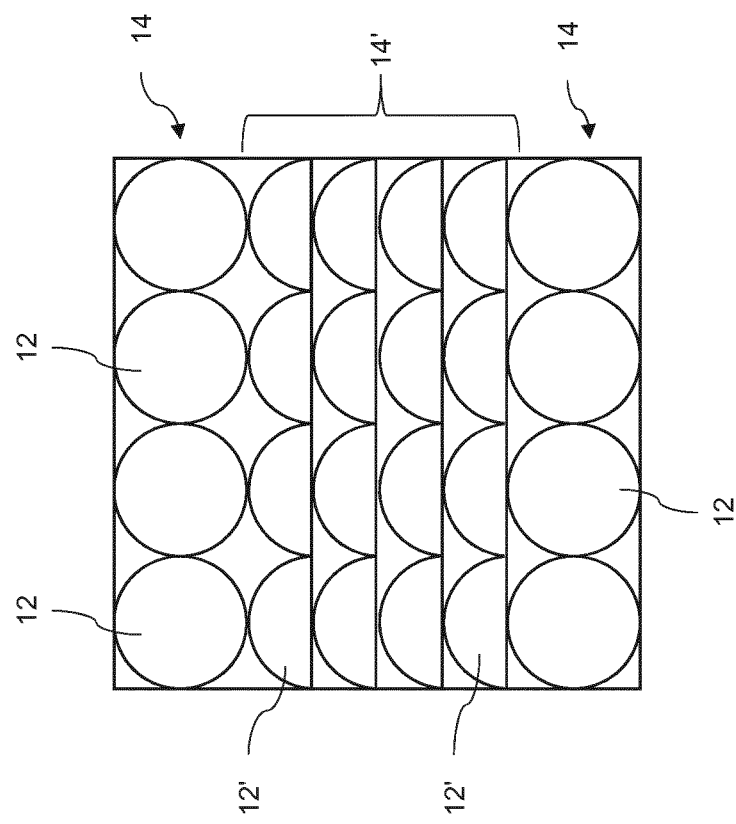
FIG. 4 and FIG. 5 show plan views of an array of projection lenses according to two embodiments of the invention.

The exact division of the projection lenses 12 and 12' into subarrays is of less significance in comparison with the dimensions of the lenses 12 and 12' on account of the great distance of the ground 13 from the projection display 7. The subarrays may consequently also be divided differently. A different division into subarrays is shown in FIG. 5. The projection lenses 12 and 12' in this array have exactly the same structure as in the array from FIG. 4. In contrast to the array from FIG. 4, the array from FIG. 5 however contains the projection lenses 12 only in the uppermost and lowermost row, which projection lenses form the first subarray 14. Four rows with projection lenses 12' that form the second subarray 14' are situated between these two rows. The light distribution produced with this array deviates only slightly from the light distribution that is generated with the array from FIG. 4.

Figure 6:
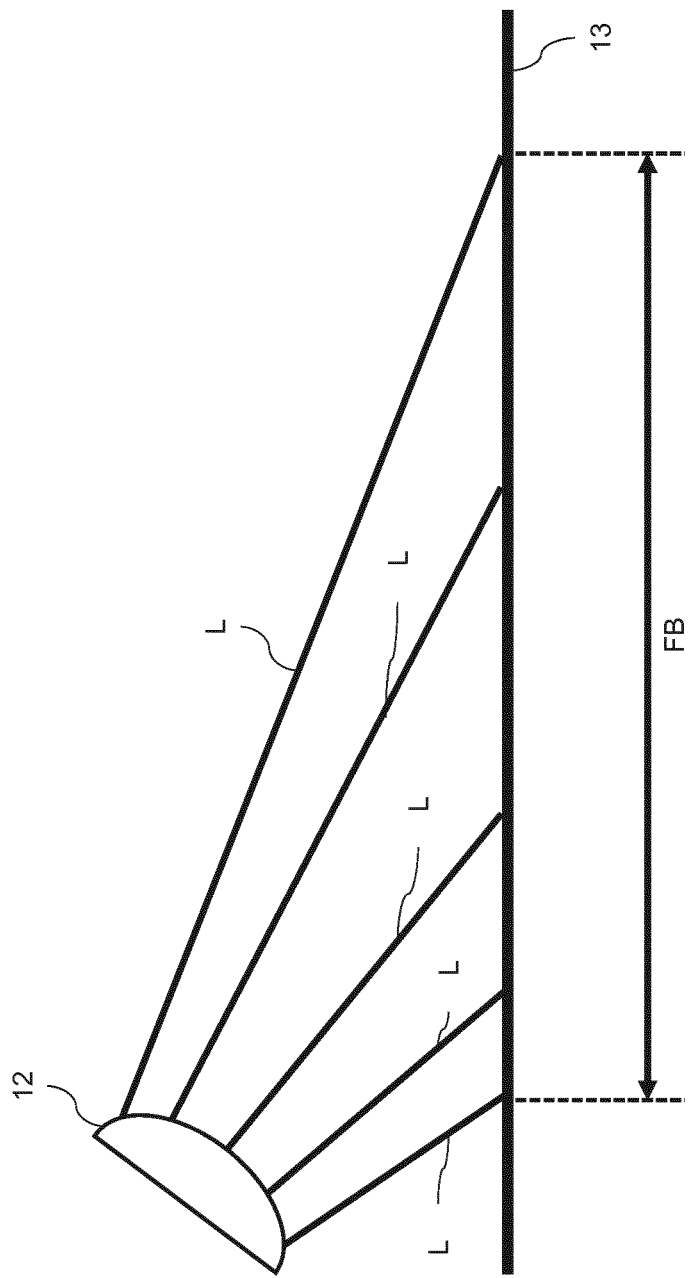
FIG. 6 and FIG. 7 show schematic side views that illustrate various surface areas that are covered in the light distribution by the projection lenses of different subarrays from FIG. 4 and FIG. 5.
Figure 7:
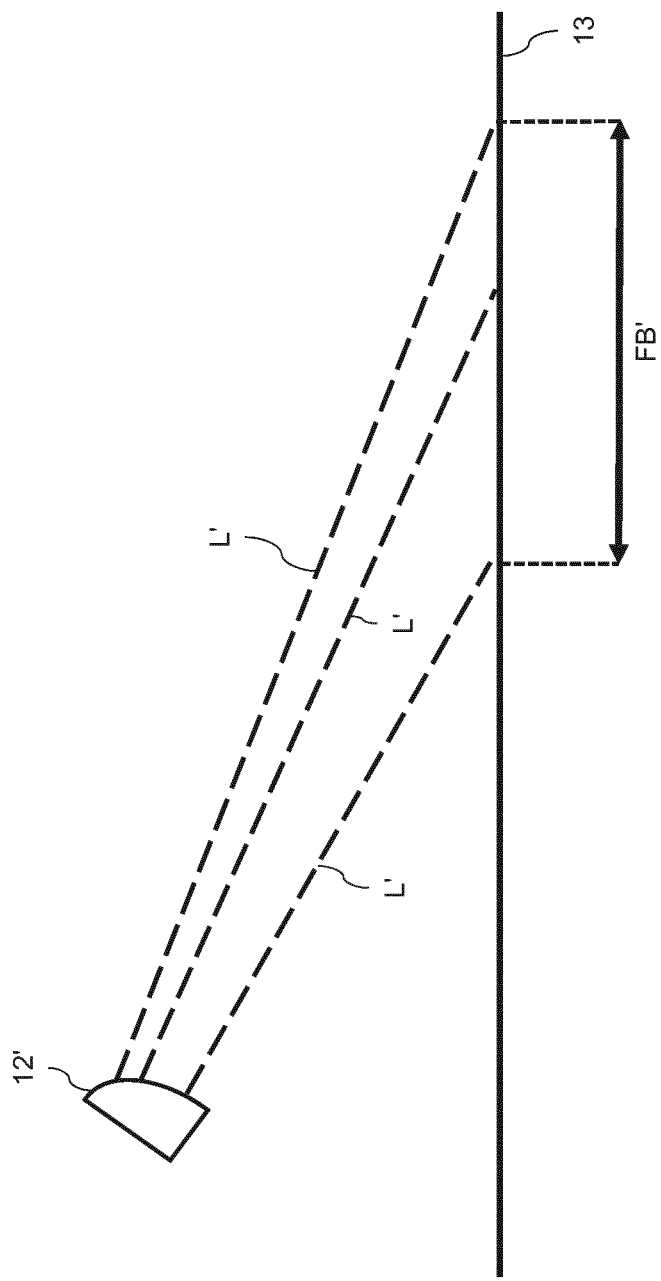

FIG. 6 and FIG. 7 show a schematic side view of the different surface areas that are covered by the two types of projection lens 12 and 12' from FIG. 4 and FIG. 5. FIG. 6 shows, by way of example, one of the projection lenses 12 with a corresponding beam path after passing the lens, this being indicated by a plurality of unbroken lines L. As is able to be seen, the surface area FB in the longitudinal direction of the vehicle is covered by the light of the projection lenses on the ground 13.

FIG. 7 shows the surface area covered by a respective projection lens 12'. The corresponding beam path after passing the lens 12' is indicated by a dashed line L'. Since light only exits through a region from the lens 12' that is half the size in comparison with the projection lens 12 of FIG. 6, a significantly smaller surface area FB' is illuminated, this overlapping with the rear section of the surface area FB. A situation is thus achieved whereby the rear region of the light distribution LV is illuminated more intensely than the front part of this light distribution, such that the decrease in the brightness with increasing distance from the projection lenses is thereby counteracted. Consequently, it is possible to produce strips with largely constant brightness in the light distribution LV.

Figure 8:
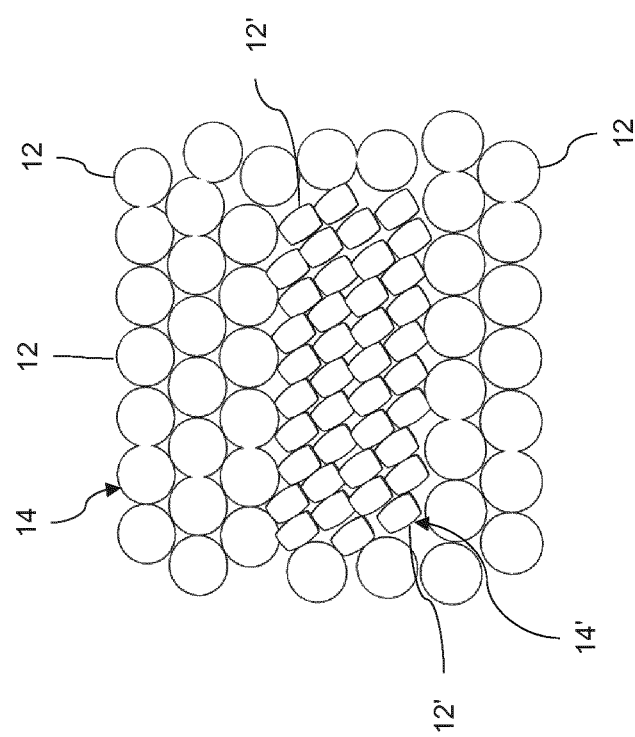
FIG. 8 shows a plan view of an array of projection lenses according to another embodiment of the invention.

FIG. 8 shows a plan view of another embodiment of an array of projection lenses. In the same way as for FIG. 4 and FIG. 5, the array comprises a subarray 14 that consists of circular lenses 12. This subarray 14 surrounds the subarray 14', which, in contrast to the embodiments of FIG. 4 and FIG. 5, does not consist of semicircular lenses but rather of lenses 12' that have four curved edges. For the sake of clarity, again only some of the lenses are referenced with the reference signs 12 or 12'.

Figure 11:
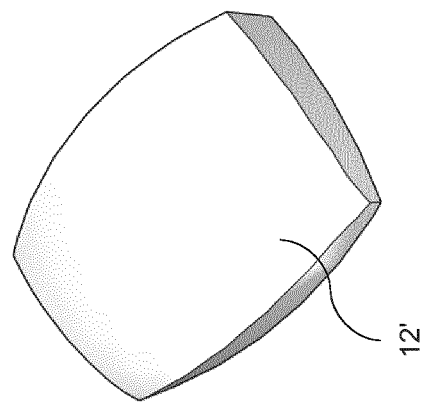
FIG. 9 to FIG. 11 show schematic illustrations that depict how the projection lenses 12' arise from the projection lenses 12 from FIG. 8.
Figure 10:
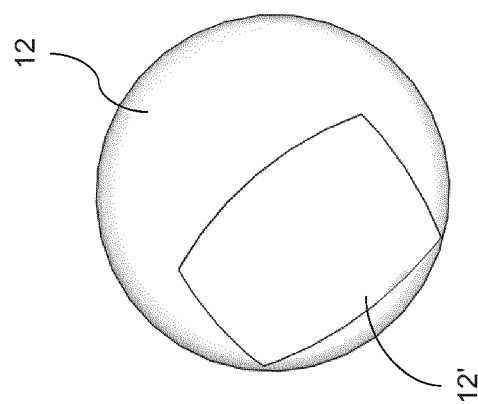
Figure 9:
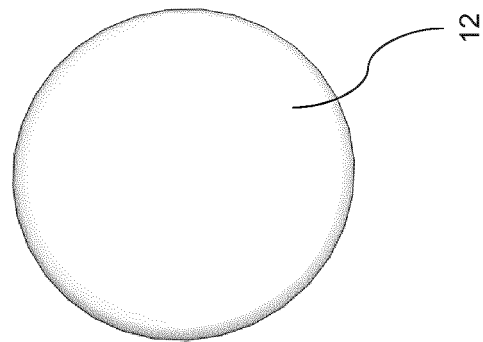

FIG. 9 to FIG. 11 clarify how the lenses 12' arise from the lenses 12 of FIG. 8. FIG. 9 first of all shows one of the circular lenses 12 from the array of FIG. 8. A region having the curved lenses illustrated in FIG. 10 is cut out from this circular lens. This cut-out region then leads to the lens 12', which is illustrated in perspective in FIG. 11.

The embodiments of the invention that are described above have a number of advantages. In particular, by using a plurality of different projection lenses in a multi-aperture projection display, it is possible to guarantee suitable setting of the brightness in the projected light distribution without losses and with a compact structure of the display. The invention is not restricted here to the above-described ambient illumination apparatus. The multi-aperture projection display according to the invention may also possibly be used in a headlight or a light of a motor vehicle.

LIST OF REFERENCE SIGNS 1 motor vehicle
2, 2', 3, 3' vehicle doors
4 door sill
5 wheel case
6 wheel
7 multi-aperture projection display
8 light propagation
9 light well
10 lighting means
11, 11' image segments
12, 12' projection lenses
13 ground
14, 14' subarrays
LV light distribution
FB, FB' surface areas
L, L' lines The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An illumination device for a motor vehicle comprising:
   a multi-aperture projection display having a lighting means for illuminating a plurality of image segments and an array of projection lenses, wherein each projection lens is assigned an image segment, from the plurality of image segments, that is projected into a projection plane by way of a corresponding one of the projection lens, such that a light distribution is produced from all of the projected image segments in the projection plane,
   wherein the array of projection lenses comprises a plurality of subarrays, wherein a respective subarray contains the same projection lenses and the projection lenses of different subarrays differ from one another such that each subarray generates a surface area in the light distribution and a size and/or a position of the generated surface areas varies between the plurality of subarrays; wherein all of the projection lenses of the array of projection lenses are based on a predetermined lens type with a prescribed shape and size, wherein the projection lenses of one or more of the subarrays each constitute a subregion of the predetermined lens type in a plan view thereof; wherein the subregion of the pretermined lens type is a region that is delineated by the area of the predetermined lens type in the plan view thereof by way of one or more lines.

2. The illumination device as claimed in claim 1, wherein the plurality of subarrays comprise a first subarray whose generated surface area corresponds to an overall area of the light distribution in the projection plane, and a second subarray whose generated surface area is a subarea of the light distribution in the projection plane.

3. The illumination device as claimed in claim 2, wherein the projection lenses of one of the subarrays each correspond to the predetermined lens type.

4. The illumination device as claimed in claim 2, wherein the plurality of image segments each contain an object structure that is projected into the projection plane by an associated one of the projection lens, wherein the object structures of the plurality of image segments that are projected by the projection lenses of the same subarray are configured such that they produce the same individual image in the corresponding surface area in the projection plane.

5. The illumination device as claimed in 4, wherein a respective object structure of the second subarray constitutes a section of a respective object structure of the first subarray, such that, in the region of overlap of the generated surface areas of the first and second subarrays, the images of the two subarrays correspond to one another in the light distribution.

6. The illumination device as claimed in claim 2, wherein the illumination device is an ambient illumination apparatus for generating a light distribution on the ground in the surroundings of a motor vehicle.

7. The illumination device as claimed in claim 6, wherein the projection lenses of the subarrays are configured such that, in an oblique installation position of the ambient illumination apparatus in the motor vehicle, the light intensity of the light radiation of the multi-aperture projection display in a first angular range, which falls on a region of the ground at a greater distance from the multi-aperture projection display than a second angular range, is higher than the light intensity of the light radiation of the multi-aperture projection display in the second angular range, wherein, in the oblique installation position, the ground is inclined with respect to a plane in which projection lenses are arranged.

8. The illumination device as claimed in claim 1, wherein the projection lenses of one of the subarrays each correspond to the predetermined lens type.

9. The illumination device as claimed in claim 1, wherein the one or more lines are at least sectionally straight and/or at least sectionally curved.

10. The illumination device as claimed in claim 1, wherein the one or more lines are at least sectionally straight and/or at least sectionally curved.

11. The illumination device as claimed in claim 1, wherein the plurality of image segments each contain an object structure that is projected into the projection plane by an associated one of the projection lens, wherein the object structures of the plurality of image segments that are projected by the projection lenses of the same subarray are configured such that they produce the same individual image in the corresponding surface area in the projection plane.

12. The illumination device as claimed in claim 1, wherein the illumination device is an ambient illumination apparatus for generating a light distribution on the ground in the surroundings of a motor vehicle.

13. The illumination device as claimed in claim 12, wherein the projection lenses of the subarrays are configured such that, in an oblique installation position of the ambient illumination apparatus in the motor vehicle, the light intensity of the light radiation of the multi-aperture projection display in a first angular range, which falls on a region of the ground at a greater distance from the multi-aperture projection display than a second angular range, is higher than the light intensity of the light radiation of the multi-aperture projection display in the second angular range, wherein, in the oblique installation position, the ground is inclined with respect to a plane in which projection lenses are arranged.

14. A motor vehicle having an illumination device, the illumination device comprising:
   a multi-aperture projection display having a lighting means for illuminating a plurality of image segments and an array of projection lenses, wherein each projection lens is assigned an image segment, from the plurality of image segments, that is projected into a projection plane by way of a corresponding one of the projection lens, such that a light distribution is produced from all of the projected image segments in the projection plane, wherein the array of projection lenses comprises a plurality of subarrays, wherein a respective subarray contains the same projection lenses and the projection lenses of different subarrays differ from one another such that each subarray generates a surface area in the light distribution and a size and/or a position of the generated surface areas varies between the plurality of subarrays; wherein all of the projection lenses of the array of projection lenses are based on a predetermined lens type with a prescribed shape and size, wherein the projection lenses of one or more of the subarrays each constitute a subregion of the predetermined lens type in a plan view thereof; wherein the subregion of the pretermined lens type is a region that is delineated by the area of the predetermined lens type in the plan view thereof by way of one or more lines.

* * * * *